United States Patent
Bartley et al.

(10) Patent No.: US 7,707,463 B2
(45) Date of Patent: Apr. 27, 2010

(54) IMPLEMENTING DIRECTORY ORGANIZATION TO SELECTIVELY OPTIMIZE PERFORMANCE OR RELIABILITY

(75) Inventors: Gerald Keith Bartley, Rochester, MN (US); John Michael Borkenhagen, Rochester, MN (US); William Paul Hovis, Rochester, MN (US); Daniel Paul Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1041 days.

(21) Appl. No.: 11/290,894

(22) Filed: Nov. 30, 2005

(65) Prior Publication Data

US 2007/0168762 A1 Jul. 19, 2007

(51) Int. Cl.
*G06F 11/00* (2006.01)
(52) U.S. Cl. ...................................................... 714/52
(58) Field of Classification Search ................... 714/30, 714/36, 41, 42, 52; 711/128
See application file for complete search history.

(56) References Cited

U.S. PATENT DOCUMENTS

| | | | | |
|---|---|---|---|---|
| 5,019,971 A | * | 5/1991 | Lefsky et al. ............... | 714/5 |
| 5,515,529 A | * | 5/1996 | Shelly et al. ............... | 714/1 |
| 5,875,464 A | * | 2/1999 | Kirk ........................... | 711/129 |
| 5,958,068 A | * | 9/1999 | Arimilli et al. .............. | 714/8 |
| 6,212,631 B1 | * | 4/2001 | Springer et al. ............. | 713/1 |
| 6,505,308 B1 | * | 1/2003 | Schwarz ..................... | 714/30 |
| 6,826,580 B2 | * | 11/2004 | Harris et al. ................ | 707/202 |
| 6,868,484 B2 | * | 3/2005 | Supnet ....................... | 711/133 |
| 6,871,297 B2 | * | 3/2005 | Puri et al. ................... | 714/30 |
| 7,017,094 B2 | * | 3/2006 | Correale et al. ............ | 714/733 |
| 7,177,986 B2 | * | 2/2007 | Rowlands et al. .......... | 711/144 |
| 7,225,300 B1 | * | 5/2007 | Choquette et al. .......... | 711/146 |
| 7,370,151 B2 | * | 5/2008 | Asher et al. ................ | 711/128 |
| 2002/0099914 A1 | * | 7/2002 | Matsunami et al. ........ | 711/154 |
| 2002/0120887 A1 | * | 8/2002 | Hughes et al. ............. | 714/42 |
| 2004/0088603 A1 | * | 5/2004 | Asher et al. ................ | 714/42 |

* cited by examiner

*Primary Examiner*—Robert Beausoliel
*Assistant Examiner*—Elmira Mehrmanesh
(74) *Attorney, Agent, or Firm*—Joan Pennington

(57) ABSTRACT

A method, and apparatus are provided for implementing a directory organization to selectively optimize performance or reliability in a computer system. A directory includes a user selected operational modes including a performance mode and a reliability mode. In the reliability mode, more directory bits are used for error correction and detection. In the performance mode, reclaimed directory bits not used for error correction and detection are used for more associativity.

16 Claims, 3 Drawing Sheets

200

| 202 | 204 |
|---|---|
| 10 BIT TAG | 4 BIT MESI |
| 0        9 | 10    13 |

| 0 | 1 | 2 | 3 | 4 | 5 | 6 | 7 | 8 |
|---|---|---|---|---|---|---|---|---|
| 0   13 | 14   27 | 28   41 | 42   65 | 66   69 | 70   83 | 84   91 | 98   111 | 112 126 |

| PARITY BIT OVER 0-69 | PARITY BIT OVER 70-126 |
|---|---|
| 127      127 | 128     128 |

| 0 | 1 | 2 | 3 | 4 | 5 | 6 | 7 | ECC |
|---|---|---|---|---|---|---|---|---|
| 0   13 | 14   27 | 28   41 | 42   65 | 66   69 | 70   83 | 84   91 | 98   111 | 112    128 |

IMPLEMENTING DIRECTORY ORGANIZATION TO SELECTIVELY OPTIMIZE PERFORMANCE OR RELIABILITY

FIELD OF THE INVENTION

The present invention relates generally to the data processing field, and more particularly, relates to a method, and apparatus for implementing a directory organization to selectively optimize performance or reliability in a computer system.

DESCRIPTION OF THE RELATED ART

Multiprocessing computer systems include multiple processors, each processor employed to perform computing tasks. A particular computing task may be performed upon one processor while other processors perform other unrelated computing tasks. Alternatively, components of a particular computing task are distributed among the multiple processors to decrease the time required to perform the computing task as a whole.

One commercially available multiprocessing computer system is a symmetric multiprocessor (SMP) system. An SMP computer system typically includes multiple processors connected through a cache hierarchy to a shared bus. A memory connected to the shared bus is shared among the processors in the system.

Many computer systems have two levels of caching referred to as L1 and L2 caches above main memory. The units of transfer between the L1 and L2 caches, and between the L2 cache and main memory are referred to as cache lines. Today, typical computer systems have a fixed line size, usually with the same line size for the L1 and L2 caches. Directories used to track cache lines include cache directories, snoop filters, and remote directories.

Directories have multiple ways of associativity that typically hold tag information, or a portion of the address of the cache line; a state field, such as modified, exclusive, shared, invalid (MESI) states typically used in cache management; and an ECC field that provides error correction and/or error detection information. Since all classes of an associativity are accessed in parallel, the error correction/detection bits normally cover all classes of associativity retrieved in a single directory access. This is done for efficiency so that the number of bits allocated for error correction/detection is minimized.

Error correction/detection could be done separately on each directory entry at the cost of additional storage cells used to hold the additional error correction/detection bits.

In some computer applications, performance is more important that reliability. If an error occurs, the application can be restarted. An example is engineering and scientific computing. Results can be recovered after an error by restarting from a previously known state.

In other computer applications, reliability is more important than performance. If an error occurs, there is a significant impact to business. An example is business transaction computing. If an error occurs during a transaction, there may be no way to recover that transaction.

There are tradeoffs between obtaining the most performance or running with the most reliably. For example, error detection and correction logic for providing high reliability consumes valuable silicon real estate that could instead be used to improve performance. Also, error detection and correction adds latency to critical paths in the computer logic.

A need exists for a mechanism to enable effective optimizations of performance or reliability in a computer system. Ideally, the user could select to configure the same silicon for performance or reliability, depending on a particular application.

SUMMARY OF THE INVENTION

Principal aspects of the present invention are to provide a method, and apparatus for implementing a directory organization to selectively optimize performance or reliability in a computer system. Other important aspects of the present invention are to provide such method, and apparatus for implementing a directory organization to selectively optimize performance or reliability in a computer system substantially without negative effect and that overcome many of the disadvantages of prior art arrangements.

In brief, a method, and apparatus are provided for implementing a directory organization to selectively optimize performance or reliability in a computer system. A directory includes a user selected operational mode including a performance mode and a reliability mode. In the reliability mode, directory rows having a predefined number of directory bits are used for error correction and detection. In the performance mode, reclaimed directory bits not used for error correction and detection are used for more associativity.

In accordance with features of the invention, one or more directory bits are used for parity checking in the performance mode. The performance mode or the reliability mode is selected at an initial program load (IPL) or during run time. When the user selected operational mode is changed during run time, a directory flush is provided before the mode is changed.

In accordance with features of the invention, alternatively the performance mode or the reliability mode is selected for a particular application and a directory includes concurrent entries for a performance mode and a reliability mode. Each directory row includes a bit in each row of the directory that specifies the directory format currently being used for that row for allowing both formats to coexist in the same directory array. Then when the user selected operational mode is changed during run time, a directory flush is not required for the mode changed.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2A, 2B, and 2C are block diagram representations illustrating a respective exemplary selective directory organization for implementing performance or reliability in accordance with the preferred embodiment.

DETAILED DESCRIPTION OF THE PREFERRED EMBODIMENTS

In accordance with features of the invention, a control register is provided that configures arrangement of the directory rows. If high reliability is desired for a given application, more directory bits are used for error correction/detection. If high performance is most critical and errors can be tolerated, fewer or zero bits are used for error correction and these otherwise error correction bits are available to be used for more ways of associativity. More ways of associativity allow the directory to track more cache lines, resulting in higher performance.

In accordance with features of the invention, predefined array storage bits in a directory are used, for example, to support full Single Error Correct, Double Error Detect (SECDED) for operation in high reliability mode. In high performance mode, those storage bits in the directory are instead used for additional directory entries (tag/MESI). Any spare bits optionally are used for simple parity checking to give single bit error detection.

Figure 1:
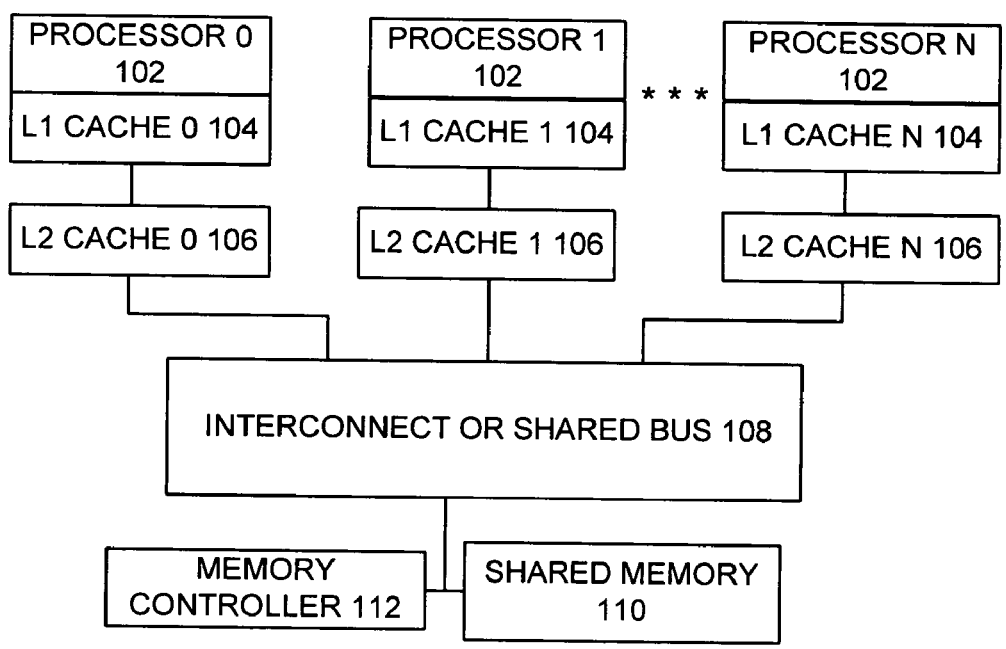
FIG. 1 is a block diagram representation of an exemplary computer system for implementing selective directory organization for implementing performance or reliability in accordance with the preferred embodiment.

Having reference now to the drawings, in FIG. 1, there is shown a cache coherent symmetric multiprocessor (SMP) computer system generally designated by the reference character 100 for implementing selective directory organization for implementing performance or reliability in accordance with the preferred embodiment. Computer system 100 includes a plurality of processors 0-N 102, each including a respective first cache L1 memory 0-N 104 and a second higher level L2 cache 0-N 106 connected via an interconnect or shared system bus 108 to a shared memory 110 and a memory controller 112 coupled to the shared memory 110.

Computer system 100 is shown in simplified form sufficient for understanding the invention. It should be understood that the present invention is not limited to use with the illustrated cache coherent symmetric multiprocessor (SMP) computer system 100 of FIG. 1. For example, computer system 100 is not limited to the illustrated two levels of caches 104, 106 multiple additional distributed caches could be used.

In accordance with features of the invention, the user can select the reliability mode or the performance mode for a selective directory organization for implementing high performance or high reliability in accordance with the preferred embodiment. The user also can select, for example, to run in high reliability mode during the day, and then the user runs programs at night that can be easily recovered but need optimum performance, so the user selects high performance mode for night runs.

In accordance with features of the invention, the user can select the reliability mode or the performance mode during an initial program load (IPL) time. The mode can be changed during run time, but a directory flush must be done before mode change.

In accordance with features of the invention, a bit in each row of the directory can specify what directory format is currently being used for that row, allowing both formats to coexist in the same array. This method allows a user to switch modes during run time, without performing a directory flush.

FIGS. 2A, 2B, and 2C show an example implementation that uses a 128 bit wide by 1024 deep array for a directory for implementing selective directory organization for implementing both performance and reliability in accordance with the preferred embodiment. It should be understood that the illustrated implementation supporting both high performance and high reliability modes that also can be changed by a user to switch modes during an initial program load (IPL) and during run time.

Referring to FIG. 2A, each directory row includes a number of fields generally designated by the reference character 200 containing a tag field 202, such as a 10 bit tag and a state field 204, such as 4 bits for modified, exclusive, shared, invalid (MESI) states. The tag field 202 and the state field 204 are included in directory entries for implementing both performance and reliability in accordance with the preferred embodiment.

Referring to FIG. 2B, there is shown an exemplary directory row generally designated by the reference character 210 for implementing a performance mode in accordance with the preferred embodiment. Performance mode directory row 210 includes, for the example 128-bit wide array format, a parity bit 127 over directory bits 0-69 and a parity bit 128 over directory bits 70-126.

Referring to FIG. 2C, there is shown an exemplary directory row generally designated by the reference character 250 for implementing a reliability mode in accordance with the preferred embodiment. Reliability mode directory row 250 includes, for the example 128-bit wide array format, an ECC field including a plurality of ECC bits 112-128 providing error detection and error correction information.

Figure 3:
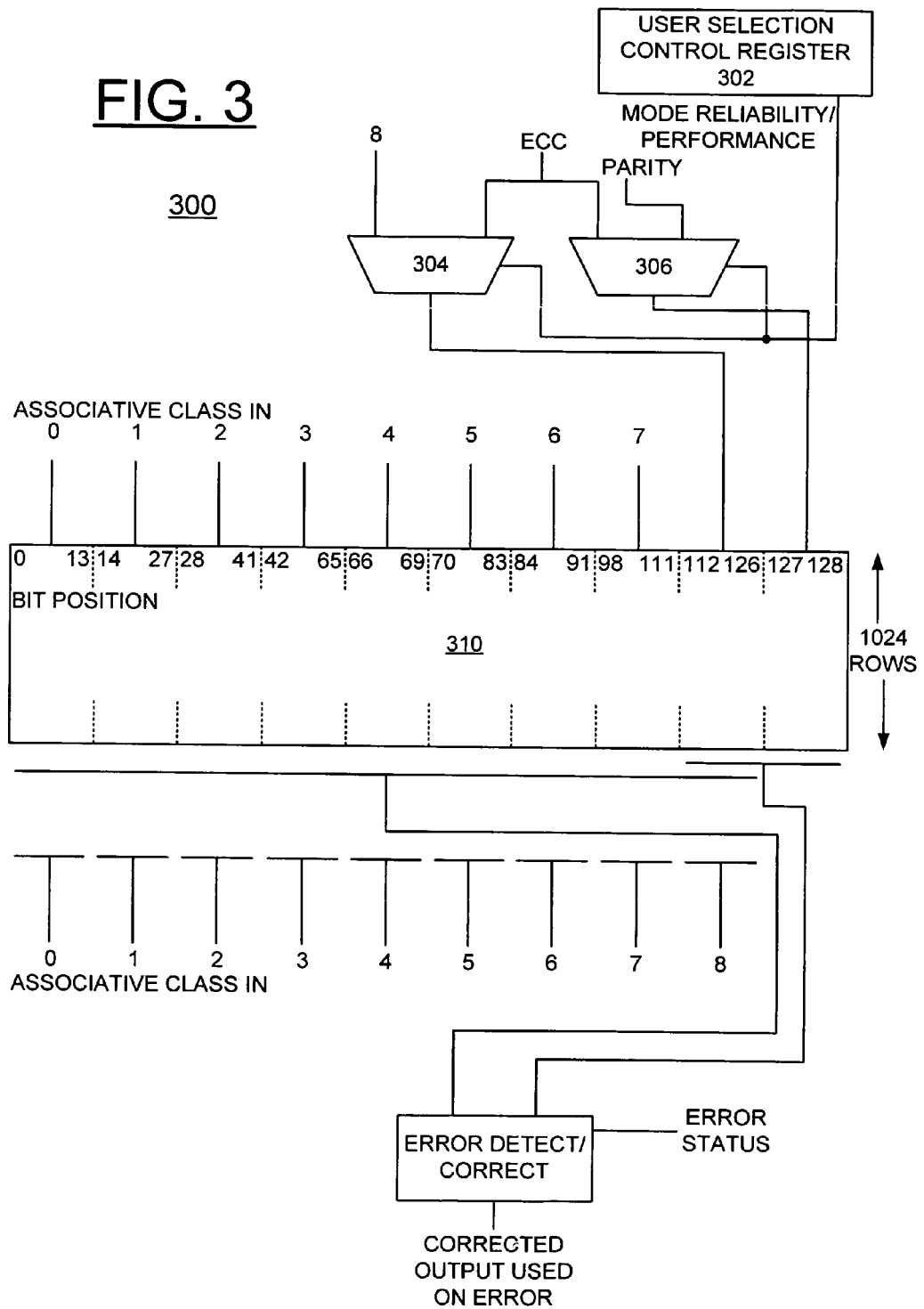
FIG. 3 is a block diagram illustrating an exemplary logical implementation of writing and reading a directory for selectively implementing performance or reliability in accordance with the preferred embodiment.

Referring to FIG. 3, there is shown an exemplary logical implementation of writing and reading a directory generally designated by the reference character 300 for selectively implementing performance or reliability in accordance with the preferred embodiment. A control register 302 receives the user selected operational mode input for the performance mode or the reliability mode. A pair of multiplexers 304, 306 respectively receiving inputs 8 and ECC, and ECC and parity, and couple respective associated inputs to a directory array 310 responsive to a select control signal for the selected performance mode or the reliability mode applied by control register 302. In the performance mode, 9 way associative by 14 bits/way+1 Parity bit uses 127 bits wide of the directory array 310. In the reliability mode, 8 way associative by 14 bits/way+16 ECC bits uses 128 bits wide of the directory array 310. In the reliability mode, the associativity class out 8 is not used.

It should be understood that the present invention can be applied to any storage application that supports error correction and/or detection to the contents being stored, for example, including data caches 104, 106 and main memory 110 as shown in computer system 100 of FIG. 1.

While the present invention has been described with reference to the details of the embodiments of the invention shown in the drawing, these details are not intended to limit the scope of the invention as claimed in the appended claims.

What is claimed is:

1. A method for implementing a directory organization to selectively optimize performance or reliability in a computer system comprising:

providing a user selected control register receiving a user selected operational mode input of a performance mode or a reliability mode;

providing control logic receiving a select control signal from said user selected control register; said select control signal responsive to said user selected operational mode input of the performance mode or the reliability mode;

responsive to said select control signal for said user selected operational mode of the reliability mode, said control logic providing directory rows having a predefined number of directory bits used for error correction and detection; and responsive to said select control signal for said user selected operational mode of the performance mode, said control logic providing directory rows having fewer than said predefined number of directory bits used for error correction and detection, and providing reclaimed directory bits not used for error correction and detection, said reclaimed directory bits used for an additional associativity class.

2. A method for implementing a directory organization to selectively optimize performance or reliability as recited in claim 1 further includes responsive to user selected operational mode of the performance mode, and providing a predefined directory bit for parity checking.

3. A method for implementing a directory organization to selectively optimize performance or reliability as recited in claim 1 further includes providing each of said directory rows with a format bit, said format bit identifying a directory format of the reliability mode or the performance mode of the directory row.

4. A method for implementing a directory organization to selectively optimize performance or reliability as recited in claim 3 further includes providing concurrent directory rows for the performance mode and the reliability mode.

5. A method for implementing a directory organization to selectively optimize performance or reliability as recited in claim 1 wherein receiving a user selected operational mode further includes receiving a user selected performance mode or user selected reliability mode during an initial program load (IPL).

6. A method for implementing a directory organization to selectively optimize performance or reliability as recited in claim 1 wherein receiving a user selected operational mode further includes receiving a user selected performance mode or user selected reliability mode during run time.

7. A method for implementing a directory organization to selectively optimize performance or reliability as recited in claim 6 further includes responsive to the user selected operational mode change during run time, providing a directory flush before the mode is changed.

8. A method for implementing a directory organization to selectively optimize performance or reliability as recited in claim 1 includes responsive to user selected operational mode of the performance mode, said reclaimed directory bits used for an additional associativity class providing more directory entries than for the reliability mode.

9. A method for implementing a directory organization to selectively optimize performance or reliability as recited in claim 1 further includes providing each directory row with a tag field including predefined bits and with a state field including predefined bits.

10. A method for implementing a directory organization to selectively optimize performance or reliability as recited in claim 1 further includes responsive to user selected operational mode of the performance mode, providing more ways of associativity than for the reliability mode.

11. Apparatus for implementing a directory organization to selectively optimize performance or reliability in a computer system comprising:
a user selected control register receiving a user selected operational mode of a performance mode or a reliability mode;
control logic receiving a select control signal from said user selected control register, said select control signal responsive to said user selected operational mode input of the performance mode or the reliability mode;
said control logic providing a predefined number of directory bits used for error correction and detection with a directory row for said select control signal responsive to said user selected operational mode of the reliability mode; and
said control logic providing a smaller number than said predefined number of directory bits used for error correction and detection with a directory row for said select control signal responsive to said user selected operational mode of the performance mode, and providing reclaimed directory bits not used for error correction and detection, said reclaimed directory bits used for an additional associativity class.

12. Apparatus for implementing a directory organization to selectively optimize performance or reliability as recited in claim 11 wherein each directory row includes a tag field including predefined bits and with a state field including predefined bits.

13. Apparatus for implementing a directory organization to selectively optimize performance or reliability as recited in claim 11 wherein said user selected control register receives said user selected performance mode or said user selected reliability mode during an initial program load (IPL).

14. Apparatus for implementing a directory organization to selectively optimize performance or reliability as recited in claim 11 wherein said user selected control register receives said user selected performance mode or said user selected reliability mode during runtime.

15. Apparatus for implementing a directory organization to selectively optimize performance or reliability as recited in claim 14 wherein a directory flush is provided before the mode is changed responsive to the user selected operational mode change during run time.

16. Apparatus for implementing a directory organization to selectively optimize performance or reliability as recited in claim 11 wherein each directory row includes a format bit, said format bit identifying a directory format of the reliability mode or the performance mode of the directory row.

* * * * *